Patented Jan. 4, 1938

2,104,357

UNITED STATES PATENT OFFICE 2,104,357

CONVERSION PRODUCTS OF DYESTUFFS AND PROCESS OF MAKING SAME

Fritz Straub and Hans Mayer, Basel, Switzerland, assignors to the firm of Society of Chemical Industry in Basle, Basel, Switzerland No Drawing. Application August 10, 1936, Serial No. 95,285. In Switzerland August 17, 1935

9 Claims. (Cl. 260—11)

This invention relates to the manufacture of dyestuffs which are conversion products of dyestuffs containing metal in complex union, by the action of a basic dyestuff on the dyestuff that contains metal in complex union and is free from sulfo-groups and carboxyl-groups.

The dyestuffs which are free from sulfo-groups and carboxyl-groups and contain metal in complex union, for instance chromium, copper, iron, cobalt, nickel, aluminium, manganese, vanadium, titanium or two or more of these metals, may belong to the series of anthraquinone-, triarylmethane-, azine-, thiazine- or oxazine-dyestuffs, or the natural dyestuffs (logwood, catechu or the like). Particularly suitable are dyestuffs which belong to the ortho-hydroxyazo-series and accordingly may be produced by coupling diazotized ortho-amino-hydroxyaryls, such as, for example, ortho-amino-hydroxybenzenes and ortho-amino-hydroxynaphthalenes which may contain further substituents besides the amino- and hydroxy-group, such as, for example, halogen (chlorine and bromine), nitro-, alkyl-, (methyl- and ethyl-), and alkoxy- (methoxy- and ethoxy-) groups, with hydroxy- and amino-aryls, such as, for example, phenols, naphthols, aminobenzenes and amino-naphthalenes, which may contain further substituents besides the hydroxy- or the amino-group, such as, for example, halogen, nitro-, alkyl-, or alkoxy-groups. Of these dyestuffs preference is given to those in the manufacture of which there have been used coupling components whose carbon atom capable of coupling belongs to an open chain (acetoacetic acid arylides which may contain substituents in the aryl nucleus) or to a heterocyclic ring (pyrazolones, aryl-pyrazolones which may also contain various substituents in the aryl nucleus, such as, for example, halogen, nitro-, alkyl- and alkoxy-groups). These metalliferous dyestuffs may be made in known manner, for instance by treatment of the dyestuff in acid, neutral or alkaline medium in an open vessel or under pressure, in presence or absence of additional substances, for instance salts of organic acids or inorganic acids, or the free acids (for instance sodium formate, benzene sulfonate, naphthalene sulfonates, sodium acetate, sodium chloride, sodium sulfate, formic acid, acetic acid, tartaric acid).

As basic dyestuffs there may be used those of the aryl- methane-, azo-, thiazine-, azine- or oxazine- series; these dyestuffs may in many cases contain groups lending solubility, for instance the sulfo- or carboxyl-group. Particularly suitable are those arylmethane dyestuffs which contain a xanthone ring. To these dyestuffs belong for example the rhodamines which are cited in the "Colour Index," 1st edition, on pages 190 to 192.

The desired reaction can be brought about, for example, by heating in an aqueous medium, in presence or absence of a suitable additional substance and under pressure or not, the metalliferous dyestuff free from sulfo-groups and carboxyl-groups with the basic dyestuff.

The conversion products obtained by the process of the invention are suitable, in particular, for coloring masses. These masses or solutions of them (for instance in water, an alcohol, a glycol, a ketone, such as acetone, hydrocarbon, such as benzene or toluene, an ether, an ether alcohol, an ester, for instance glycol-alkyl-ether or butyl acetate, a drying or hardening oil, a mixture of solvents, such as are used for nitrocellulose varnishes or the like) may be made from a cellulose basis or from a natural or artificial resin basis. With a cellulose basis there are made, for example lacquers and plastic masses consisting of or containing nitrocellulose, acetylcellulose, ethylcellulose, benzylcellulose or other esters or ethers of cellulose. The masses made from a natural resin basis may contain a lacquer resin, such as copal, amber, shellac, colophony, or a wax, such as carnauba wax or ozokerite; also natural polymerization products, such as caoutchouc, balata or gutta percha. Masses having an artificial resin basis may be made, for example, from the condensation products of aldehydes with phenols, or with aromatic amines, for instance aniline, or with an acid amide, for instance urea, thiourea and their derivatives; also arylsulfamides; condensation products of polybasic acids with polyhydric alcohols, for instance glyptals and alkyd resins; polymerization products, for instance vinyl resins, styrene resins or acrylic acid resins, and, finally, casein.

The dyestuff may be incorporated in the mass in any desired manner, for instance by uniting the solution of the mass with the dyestuff, for instance by grinding; or by mixing the solid mass with the dyestuff, for instance by rolling or kneading. During either of these operations suitable additions may be made, for example of a higher fatty acid, a filling agent, such as barium sulfate, zinc oxide or titanium oxide, or a softening agent, for instance a plasticiser, such as triphenylphosphate, tricresylphosphate, glycerine or castor oil.

The colored masses, which may have covering power or may be transparent or glazed or opaque, may have very varied tints which are very fast, particularly to light.

The following examples illustrate the invention, the parts being by weight:—

*Example 1*

A mixture of 40 parts of the cobalt compound of the dyestuff from diazotized 4-nitro-2-amino-1-phenol and acetoacetic acid anilide of the formula

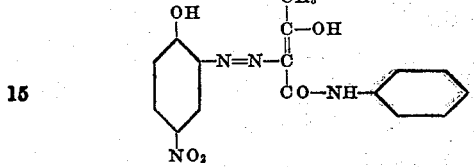

made as described in French Patent No. 758,264, with 1000 parts of water is boiled and there is added a solution of 20 parts of Rhodamine 6G Extra (Colour Index, 1st edition, No. 752) of the formula

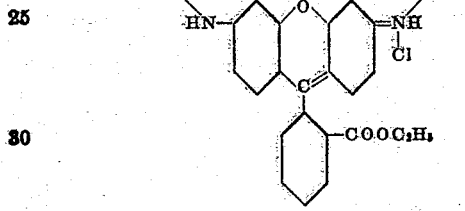

After boiling in a reflux apparatus for half an hour the new dyestuff which has completely separated is filtered, washed with water and dried at a moderate temperature. This product is a brick red powder which dissolves very sparingly in water, to a greenish-yellow solution in concentrated sulfuric acid and freely in alcohol to a yellow orange solution.

4 parts of the dyestuff are dissolved in 1000 parts of a commercial cellulose nitrate lacquer and applied to a suitable support; a vivid orange coating is obtained.

*Example 2*

A mixture of 40 parts of the cobalt compound of the dyestuff from diazotized 4-nitro-2-amino-1-phenol and 1-phenyl-3-methyl-5-pyrazolone of the formula

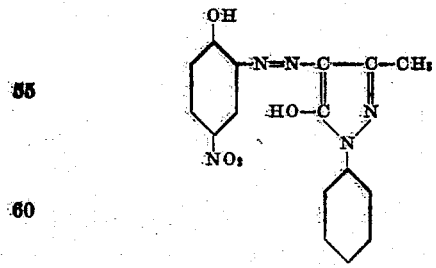

made as described in French Patent No. 758,264, with 1000 parts of water is boiled and a solution of 22 parts of Rhodamine 6G Extra (Colour Index, 1st edition, No. 752) in 500 parts of water is added. The new dyestuff is thus precipitated and after some boiling is filtered and very thoroughly washed. On drying there is obtained a yellow-red powder which dissolves very sparingly in water, in concentrated sulfuric acid to a yellow solution and in alcohol freely to a scarlet red solution.

4 parts of this dyestuff are added to 1000 parts of a commercial nitrocellulose lacquer and the solution when applied to a suitable support yields a vivid orange coating.

*Example 3*

20 parts of the cobalt compound of the dyestuff from diazotized 4-nitro-2-amino-1-phenol and 1-phenyl-3-methyl-5-pyrazolone are mixed with 800 parts of water and 6.7 parts of caustic soda solution of 30 per cent. strength and the mixture is boiled, whereupon a solution of 24 parts of Rhodamine B Extra (Colour Index, 1st edition, No. 749) of the formula in 500 parts of water is added. The new dyestuff is immediately precipitated; the whole is boiled for 1 hour in a reflux apparatus, filtered, and the dyestuff washed with much water. The filtrate still contains some Rhodamine B. After drying and grinding there is obtained a brown-red powder which dissolves very sparingly in water to a bluish-red solution, in concentrated sulfuric acid to a greenish-yellow solution and very freely in alcohol to a pure blue-red solution. A solution in a commercial nitrocellulose lacquer may be applied to a suitable support to produce a bluish-red coating fast to light.

*Example 4*

A mixture of 20 parts of the cobalt compound of the dyestuff from diazotized 4-nitro-2-amino-1-phenol and acetoacetic acid anilide, made as described in French Patent No. 758,264, with 1000 parts of water, is boiled and there is added a solution of 10 parts of Brilliant Glacier Blue (Colour Index, 1st edition, No. 664) of the formula in 500 parts of water. The new dyestuff is precipitated in crystalline form insoluble in water, and after the whole has been boiled for some time it is filtered and washed. After drying there is obtained a greenish-black powder, soluble in concentrated sulfuric acid to a yellow orange solution and in alcohol to a yellowish-green solution.

4 parts of this dyestuff, dissolved in 1000 parts of a commercial nitrocellulose lacquer, yield on suitable supports yellowish-green coatings.

Instead of the cobalt compounds mentioned in the above examples there may also be used other complex metal compounds, such as, for instance, chromium-, iron-, copper-, manganese-, nickel- and titanium-compounds.

What we claim is:—

1. Conversion products of dyestuffs containing metal in complex union, obtained by heating in an aqueous medium basic dyestuffs with dyestuffs that contain metal in complex union and are free from sulfo-groups and carboxyl-groups, which conversion products are particularly suitable for dyeing masses varied tints of very good fastness properties.

2. Conversion products of dyestuffs containing metal in complex union, obtained by heating in an aqueous medium basic dyestuffs with ortho-hydroxyazo-dyestuffs that contain metal in complex union and are free from sulfo-groups and carboxyl-groups, which conversion products are particularly suitable for dyeing masses varied tints of very good fastness properties.

3. Conversion products of dyestuffs containing metal in complex union, obtained by heating in an aqueous medium arylmethane dyestuffs with ortho-hydroxyazo-dyestuffs that contain metal in complex union and are free from sulfo-groups and carboxyl-groups, which conversion products are particularly suitable for dyeing masses varied tints of very good fastness properties.

4. Conversion products of dyestuffs containing metal in complex union, obtained by heating in an aqueous medium arylmethane dyestuffs containing a xanthone ring with ortho-hydroxyazo-dyestuffs that contain metal in complex union and are free from sulfo-groups and carboxyl-groups, which conversion products are particularly suitable for dyeing masses varied tints of very good fastness properties.

5. Conversion products of dyestuffs containing metal in complex union, obtained by heating in an aqueous medium arylmethane dyestuffs containing a xanthone ring with ortho-hydroxyazo-dyestuffs that contain cobalt in complex union and are free from sulfo-groups and carboxyl-groups, which conversion products are particularly suitable for dyeing masses varied tints of very good fastness properties.

6. Conversion products of dyestuffs containing metal in complex union, obtained by heating in an aqueous medium arylmethane dyestuffs containing a xanthone ring with complex cobalt compounds free from sulfo-groups and carboxyl-groups of the azo-dyestuffs from diazotized ortho-hydroxyaminobenzenes and pyrazolones, which conversion products are particularly suitable for dyeing masses varied tints of very good fastness properties.

7. Conversion products of dyestuffs containing metal in complex union, obtained by heating in an aqueous medium arylmethane dyestuffs containing a xanthone ring with complex cobalt compounds free from sulfo-groups and carboxyl-groups of the azo-dyestuffs from diazotized ortho - hydroxyaminobenzenes and acetoacetic acid arylides, which conversion products are particularly suitable for dyeing masses varied tints of very good fastness properties.

8. Conversion product of a dyestuff containing metal in complex union, obtained by heating in an aqueous medium the complex cobalt compound of the azo-dyestuff from diazotized 4-nitro-2-amino-1-phenol and 1-phenyl-3-methyl-5-pyrazolone with the dyestuff of the formula

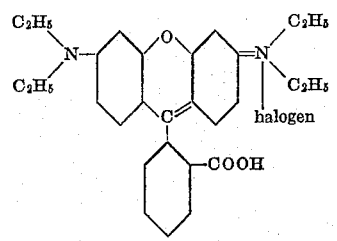

which product dyes masses bluish-red tints fast to light.

9. Conversion product of a dyestuff containing metal in complex union, obtained by heating in an aqueous medium the complex cobalt compound of the azo-dyestuff from diazotized 4-nitro-2-amino-1-phenol and acetoacetic acid anilide with the dyestuff of the formula

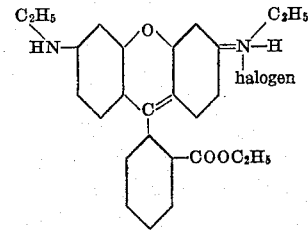

which product dyes masses orange tints fast to light.

FRITZ STRAUB.
HANS MAYER.